(12) United States Patent
Plastina et al.

(10) Patent No.: US 7,681,238 B2
(45) Date of Patent: Mar. 16, 2010

(54) REMOTELY ACCESSING PROTECTED FILES VIA STREAMING

(75) Inventors: Daniel Plastina, Sammamish, WA (US); Eduardo P. Oliveira, Redmond, WA (US); James H. Dooley, IV, Bellevue, WA (US); James T. Walter, Issaquah, WA (US); Jason S. Flaks, Redmond, WA (US); Sanjay Bhatt, Redmond, WA (US); William F. Schiefelbein, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1004 days.

(21) Appl. No.: 11/201,531

(22) Filed: Aug. 11, 2005

(65) Prior Publication Data

US 2007/0039055 A1 Feb. 15, 2007

(51) Int. Cl.
*G06F 7/04* (2006.01)
(52) U.S. Cl. .......................... 726/26; 380/212
(58) Field of Classification Search ................. 726/26; 380/212
See application file for complete search history.

(56) References Cited

U.S. PATENT DOCUMENTS

| | | | |
|---|---|---|---|
| 5,293,310 | A | 3/1994 | Carroll et al. |
| 5,793,980 | A | 8/1998 | Glaser et al. |
| 6,021,438 | A | 2/2000 | Duvvoori et al. |
| 6,118,450 | A | 9/2000 | Proehl et al. |
| 6,205,140 | B1 | 3/2001 | Putzolu et al. |
| 6,248,946 | B1 | 6/2001 | Dwek |
| 6,343,281 | B1 | 1/2002 | Kato |
| 6,453,336 | B1 | 9/2002 | Beyda et al. |
| 6,453,339 | B1 | 9/2002 | Schultz et al. |
| 6,463,468 | B1 | 10/2002 | Buch et al. |
| 6,496,802 | B1 | 12/2002 | van Zoest et al. |
| 6,526,411 | B1 | 2/2003 | Ward |
| 6,587,127 | B1 | 7/2003 | Leeke et al. |

(Continued)

FOREIGN PATENT DOCUMENTS

EP 1189437 A1 3/2002

(Continued)

OTHER PUBLICATIONS

Edward Swierk, et al., The Roma Personal Metadata Service, Mobile Networks and Applications vol. 7, pp. 407-418, 2002.

(Continued)

*Primary Examiner*—Kambiz Zand
*Assistant Examiner*—Amare Tabor
(74) *Attorney, Agent, or Firm*—Senniger Powers LLP (57) ABSTRACT

A source device permits a user of a remote device to access a protected file on the source device when the user of the remote device has a right to access the protected file. The user locates the protected file on the source device using the remote device and accesses the protected file using a media player on the remote device. The media player constructs a path by which the source device streams the protected file. The remote device responds to an authentication request from the source device that the user of the remote device has a right to access the protected file. The user is authenticated to confirm that the user of the remote device has a right to access the protected file. The protected file is streamed to the remote device via a path constructed by the remote device.

19 Claims, 3 Drawing Sheets

U.S. PATENT DOCUMENTS

| | | | |
|---|---|---|---|
| 6,662,231 B1 | 12/2003 | Drosset et al. | |
| 6,760,721 B1 | 7/2004 | Chasen et al. | |
| 6,772,408 B1 | 8/2004 | Velonis et al. | |
| 6,792,449 B2 | 9/2004 | Colville et al. | |
| 6,857,130 B2 | 2/2005 | Srikantan et al. | |
| 6,934,837 B1 * | 8/2005 | Jaisimha et al. | 713/151 |
| 6,952,475 B1 | 10/2005 | Horn et al. | |
| 7,043,525 B2 | 5/2006 | Tuttle et al. | |
| 7,047,241 B1 | 5/2006 | Erickson | |
| 7,093,296 B2 | 8/2006 | Nusser et al. | |
| 7,181,523 B2 * | 2/2007 | Sim | 709/226 |
| 7,363,278 B2 * | 4/2008 | Schmelzer et al. | 705/67 |
| 7,376,581 B2 * | 5/2008 | DeRose et al. | 705/14 |
| 7,383,229 B2 * | 6/2008 | Jacoby | 705/52 |
| 7,403,564 B2 * | 7/2008 | Laksono | 375/240.16 |
| 2001/0014876 A1 | 8/2001 | Miyashita | |
| 2001/0031066 A1 | 10/2001 | Meyer et al. | |
| 2002/0001395 A1 | 1/2002 | Davis et al. | |
| 2002/0023164 A1 | 2/2002 | Lahr | |
| 2002/0026503 A1 | 2/2002 | Bendinelli et al. | |
| 2002/0033844 A1 | 3/2002 | Levy et al. | |
| 2002/0045441 A1 | 4/2002 | Ralston et al. | |
| 2002/0055951 A1 | 5/2002 | Shigetomi et al. | |
| 2002/0056040 A1 | 5/2002 | Simms | |
| 2002/0069218 A1 | 6/2002 | Sull et al. | |
| 2002/0071553 A1 | 6/2002 | Shirai et al. | |
| 2002/0099737 A1 | 7/2002 | Porter et al. | |
| 2002/0103920 A1 | 8/2002 | Berkun et al. | |
| 2002/0107803 A1 | 8/2002 | Lisanke et al. | |
| 2002/0113824 A1 | 8/2002 | Myers | |
| 2002/0134220 A1 | 9/2002 | Yamane et al. | |
| 2002/0138619 A1 | 9/2002 | Ramaley et al. | |
| 2002/0143976 A1 | 10/2002 | Barker et al. | |
| 2002/0157095 A1 | 10/2002 | Masumitsu et al. | |
| 2003/0021413 A1 | 1/2003 | Kiiveri et al. | |
| 2003/0028613 A1 | 2/2003 | Mori | |
| 2003/0050058 A1 | 3/2003 | Walsh et al. | |
| 2003/0120928 A1 | 6/2003 | Cato et al. | |
| 2003/0135513 A1 | 7/2003 | Quinn et al. | |
| 2003/0177490 A1 | 9/2003 | Hoshino et al. | |
| 2003/0221541 A1 | 12/2003 | Platt | |
| 2003/0236582 A1 | 12/2003 | Zamir et al. | |
| 2004/0006575 A1 | 1/2004 | Visharam et al. | |
| 2004/0017997 A1 | 1/2004 | Cowgill | |
| 2004/0059795 A1 | 3/2004 | Ramey | |
| 2004/0064476 A1 | 4/2004 | Rounds | |
| 2004/0086268 A1 | 5/2004 | Radha et al. | |
| 2004/0128308 A1 | 7/2004 | Obrador | |
| 2004/0172593 A1 | 9/2004 | Wong et al. | |
| 2004/0243834 A1 | 12/2004 | Stefik et al. | |
| 2004/0260786 A1 | 12/2004 | Barile | |
| 2004/0267693 A1 | 12/2004 | Lowe et al. | |
| 2004/0268386 A1 | 12/2004 | Logan et al. | |
| 2005/0021478 A1 | 1/2005 | Gautier et al. | |
| 2005/0081159 A1 | 4/2005 | Gupta et al. | |
| 2005/0086501 A1 * | 4/2005 | Woo et al. | 713/189 |
| 2005/0108430 A1 * | 5/2005 | Howarth et al. | 709/245 |
| 2005/0114896 A1 | 5/2005 | Hug et al. | |
| 2005/0125564 A1 | 6/2005 | Bushmitch et al. | |
| 2005/0131765 A1 | 6/2005 | Rivera et al. | |
| 2005/0149450 A1 | 7/2005 | Stefik et al. | |
| 2005/0188193 A1 | 8/2005 | Kuehnel et al. | |
| 2005/0210279 A1 | 9/2005 | Lee et al. | |
| 2005/0234958 A1 | 10/2005 | Sipusic et al. | |
| 2005/0240758 A1 | 10/2005 | Lord et al. | |
| 2005/0278726 A1 | 12/2005 | Cano et al. | |
| 2006/0271989 A1 | 11/2006 | Glaser et al. | |
| 2007/0124201 A1 | 5/2007 | Hu et al. | |
| 2007/0143488 A1 | 6/2007 | Pantalone | |

OTHER PUBLICATIONS

Kesden, Lecture 33: Content Scrambling System, Course: 15-412 Operating Systems: Design and Implementation, Dec. 6, 2000, 15 pgs.

* cited by examiner

REMOTELY ACCESSING PROTECTED FILES VIA STREAMING

BACKGROUND

Embodiments of the present invention relate to the field of media players for remotely accessing protected files. In particular, embodiments of this invention relate to enabling a scenario in which a user on a remote device can manage/navigate/search for the user's files on a source device using standard tools and, upon invocation to play a particular file on a source device, offer up a secure, streaming URL by which the source device provides the file to the remote device.

Using traditional file operations, a protected file such as a file controlled by digital rights management (DRM) can only be played on a device, such as a PC, that hosts its license. For example, when a file is to be played by WINDOWS Media Player (WMP), WMP opens the file and tries to play it. In that process, if the file is found to have DRM, then the DRM subsystem is invoked to validate the license. In absence of a valid license on the PC executing WMP, an attempt is made to acquire one for the PC. Because DRM content generally has a small limit as to the number of machines (e.g.: 3) that can be licensed, access by a remote PC is limited. If the file came from a source PC, the source PC likely already has a license. Reuse of the source license is one preferable solution.

At least some operating systems, such as WINDOWS®, have a media streaming service capability such as "WINDOWS® Media Connect" (WMC). WMC permits streaming of content from one device to another, e.g., PC to PC, in a way that does not require stringent licensing rules. This streaming leverages streaming media protocols. These protocols are geared towards playback of content and do not generally permit file operations such as metadata updates, content updates, etc. The content may additionally be encrypted when in transit from one device to another such that only the requesting device can decrypt the content. The content is generally considered "protected" when streamed whereas it is deemed very vulnerable when accessible via file copy protocols (SMB).

While nearly any transfer protocol, such as SMB, HTTP, RTSP, or MMS can be used for both streaming and file copying, copyright holders of the media frequently desire to require the addition of encryption to the protocol as there are numerous programs that create file copies from the presumably "streaming" protocols listed above.

In order to protect the copyright holders of the media, in many cases, contracts stipulate streaming and/or encryption as a mode of remote access.

WINDOWS® users make heavy use of the SMB protocol as part of common applications like the WINDOWS® Explorer shell application. This application lets a user look at files anywhere on their network and manage them. Media that is protected by digital rights management (DRM) may not be played in this scenario for the above cited reasons.

SUMMARY

Embodiments of the invention include an access which has a security level protocol (e.g., a SMB protocol, a non-SMB protocol, NFS, or the like). In an embodiment, the invention includes streaming a protected file on a path in a secure manner. Embodiments of the invention apply to any SMB aware devices, many of which exist because of the open source SMB packages, such as a SAMBA server.

Alternatively, embodiments of the invention provide secure access of DRM encrypted content (e.g., multimedia files) by having a source device which looks to a remote device to authenticate the user of the remote device. In addition, embodiments of the invention construct the protocols to find the DRM encrypted content, which protocols are different from the protocols used to stream the content.

Alternatively, embodiments of the invention may comprise various other methods and apparatuses.

Other features will be in part apparent and in part pointed out hereinafter.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
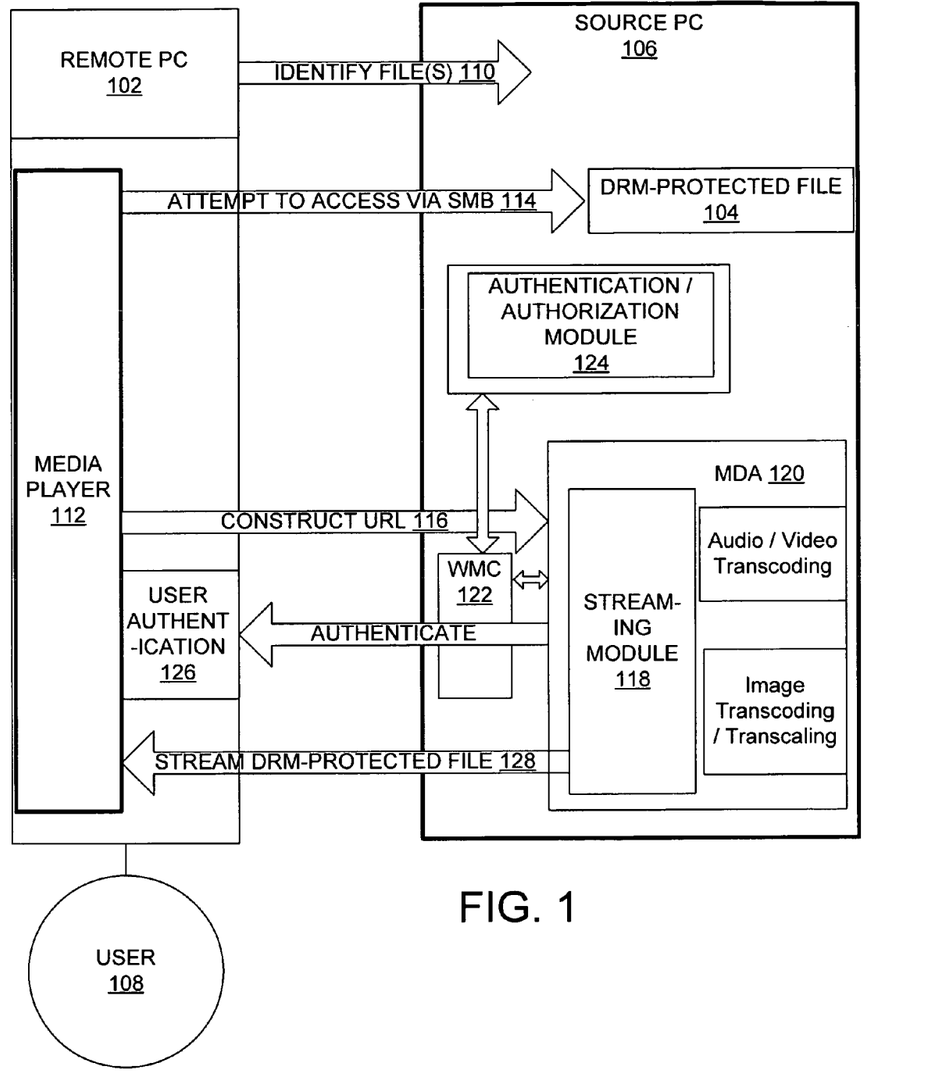
FIG. 1 is a block diagram of an exemplary embodiment of a remote PC accessing a DRM-protected file on a source PC.

Referring first to FIG. 1, a block diagram is presented to illustrate an exemplary embodiment of a remote device such as remote PC 102 accessing a protected file such as a digital rights management protected file 104 on a source device such as a source PC 106. PC 102 is referred to as remote because it is separate in some way from the source PC 106. In this illustration, it is assumed that a user 108 of the remote PC 102 has the right to access DRM-protected file 104.

In one embodiment, the user of remote PC 102 would initially identify (by browsing or other review) one or more files on the source PC 106, as indicated by arrow 110. Once a desired DRM-protected file 104 is identified by the user 108 via the remote PC 102, the user 108 would invoke a media player 112 to access the desired file 104 via a protocol such as SMB (service message block) at 114. Next, the media player 112 constructs a URL at 116 to interface with a streaming software module 118 of a media delivery application (MDA) 120 via WINDOWS® Media Connect (WMC) 122 of the source PC 106. In one embodiment, the MDA 120 may be a component or module of an application, an application, software, an application program, or a set of computer-executable instructions that delivers or assists in delivering media files from the source PC 106 to the remote PC 102. In one embodiment, WMC 122 is an application or a communication module of the source PC 106 that interacts with, hosts, and/or controls the MDA 120.

In one example, for every request received from user 108, MDA 120 generates events such as an authentication event. In one embodiment, this authentication or authorization event contains the logical URL, as well as the complete request from the media player 112. WMC 122 translates the logical URL to the physical path of the file. In another embodiment, for some logical URLs, WMC 122 does not need to take any action and may simply return success to the MDA 120. Alternatively, for other logical URLs, WMC 122 determines whether any request from remote PC 102 is authorized to access the file, (e.g., file 104). If the logical URL is generated from a UNC path, such as a path exposed by the SMB server on source PC 106, WMC 122 then needs to authenticate the user 108 before WMC 122 allows MDA 120 to stream the file 104 to the media player 112.

In one embodiment, when a user authentication is required, WMC 122 passes the challenge-response from the authentication event to the authentication module 124. The authentication module 124 verifies whether the challenge-response is present in the authentication event. If the challenge response is absent, the authentication process results in an ACCESS_DENIED error and user access is denied. In another embodiment, the authentication module 124 generates an authentication challenge for the media player 112. In this embodiment, WMC 122 passes this challenge to MDA 120 and MDA 120 would fail the request from the media player 112 and passes the authentication challenge to the media player 112. The media player 112 may respond to the authentication challenge by sending an authentication challenge-response. This challenge-response essentially represents the user's credentials of media player 112. The format and/or form of the challenge-response may vary depending on the authentication protocol being used. Upon receiving a new request including the challenge-response from media player 112, MDA 120 generates a similar authentication event in response to the new request, albeit this time the challenge-response is included in the request from media player 112, and passes the challenge-response with the event. WMC 122 removes the challenge-response from the event and passes the event to the authentication module 124 which determines whether to deny or grant the request. When authentication module 124 successfully authenticates user 108, authentication module 124 generates an access token which WMC 122 may use later to authorize the user's access to the requested content (e.g., file 104). It is to be noted that depending upon the authentication scheme being used, multiple round trips from media player 112 to MDA 120 may be required to authenticate media player 112.

In another embodiment, once the request succeeds, MDA 120 generates an authorization event to the WMC 122. WMC 122 next uses the access token acquired during the authentication event to verify the user's rights to playback the protected content (e.g., file 104). If the user doesn't have the right to access the content, WMC 122 may fail the authorization event. In such case, MDA 120 would fail the request from media player 112 with a "Forbidden" error.

Figure 2:
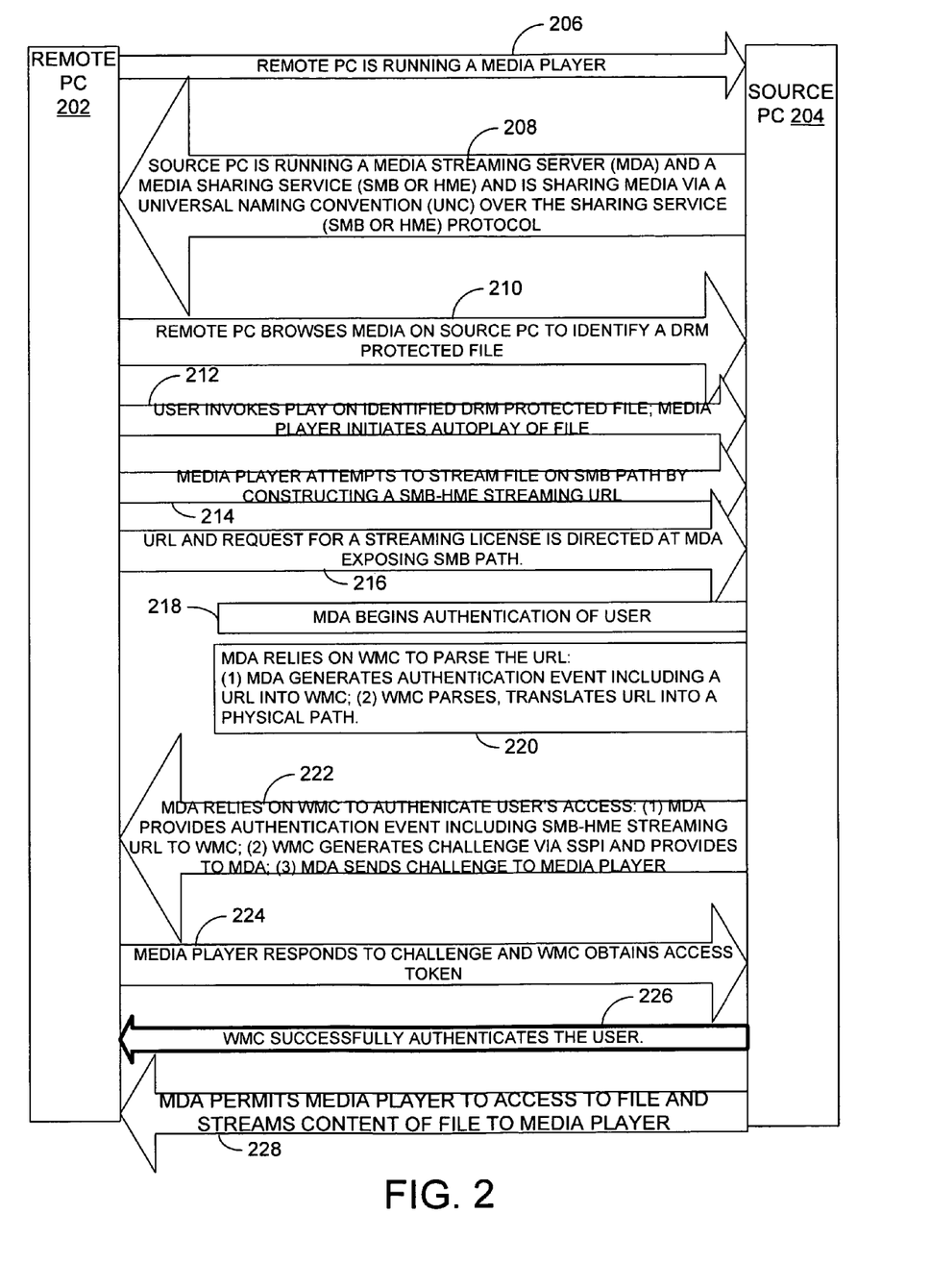
FIG. 2 is an exemplary diagram illustrating chronological operation of an embodiment of the invention.

Referring next to FIG. 2, an exemplary diagram is presented illustrating chronological operation of an embodiment of the invention. In one embodiment, consider a scenario where a remote PC 202 is trying to play a protected file on a source PC 204. The remote PC 202 is running a media player (e.g., WINDOWS® Media Player or other device) at 206. The source PC 204 is running a media streaming server (e.g., a media delivery application—MDA) as well as media sharing service at 208. The source PC 204 is sharing media via its UNC shares (e.g., over an SMB protocol) at 208. A user on the remote PC 202 browses or searches media on the source PC 204 on the UNC shares via SMB at 210. The user invokes a PLAY action with respect to one of the media files and the media player is asked to play the file via an auto-play association at 212.

When a media player needs to stream content discovered on an SMB path (\\serverSMB\folder\ ... ), the media player constructs a particular URL (e.g., an SMB-HME Streaming URL) and uses the constructed URL for streaming the content at 214. This constructed URL is directed at the MDA, such as an MDA server on a server machine, exposing the SMB path, at 216. For example, the media player retrieves the path format from the source device by reading a new tag in a source (e.g., UPnP Media Server device document) which source device uses to specify which port to be used for transfer, such as RTSP. Next, the media player permanently constructs URL (i.e., hardcodes) some specific paths (described below) to stream the content. Embodiments of the URL take on the form of one of the following using either HTTP or RTSP protocol:

//serverSMB:10243/WMPNSSv3/UNC/
?UNC=\\serverSMB\asf\artist\title.wma
//serverSMB:554/WMPNSSv3/UNC/
?UNC=\\serverSMB\asf\artist\title.wma In the above URL embodiments, HTTP or RTSP streaming protocols are specified but the remainder of the URL is the same. Those skilled in the art will recognize other embodiments.

In another embodiment, the URL format may also be part of a device document or other source that the source device provides. In yet another embodiment, only the specific path may be part of a device document or other source that the source device provides.

At this point, at 218, MDA begins to authenticate the user before passing back a stream to the media file or even acknowledging existence of the file. In one embodiment, authentication is done in the following sequence:

The media player attempts to stream from an SMB-HME Streaming URL

The MDA relies on the media connect function (e.g., WINDOWS® Media Connect (WMC)) to parse the URL at 220. In one particular embodiment, the MDA generates an authentication event including a transformed URL (e.g., an SMB-HME streaming URL) into the WMC at 220. In another embodiment, WMC parses and translates the SMB-HME streaming URL into a physical path and returns to MDA at 220. In an alternative embodiment, the MDA relies on the media connect function to translate the URL passed by MDA in the authentication event at 220 into a physical path of the file. In this embodiment, the MDA generates an authentication event including a logical URL into the WMC at 220. WMC parses and translates the SMB-HME streaming URL into a physical path. As such, the MDA does not need the physical path during the authentication event.

In one embodiment, the authentication event is a data structure or an interface that is used between MDA and WMC, and other data structure or interface implementations may be used without departing from the scope of the present invention. As an example, the exemplary code below illustrates a series of requests exchanged between WMP and MDA for protected as well as unprotected content access.

Un-protected streaming:
GET/WMCv2/UNC/
?UNC=\\serverSMB\asf\artist\title.wma HTTP/1.1
Accept: */*
User-Agent: NSPlayer/10.0.0.3646 WMFSDK/10.0
Accept-Encoding: gzip, deflate
Host: sbhatt4:10243
Connection:Keep-Alive
HTTP/1.1 200 OK
Content-Length: 618330
Content-Type: audio/x-ms-wma Server: Microsoft-HTTPAPI/1.0
Accept-Ranges: bytes
TransferMode.DLNA.ORG: Streaming
Date: Thu, 21 Jul. 2005 19:58:08 GMT
Below is an example of the logical URL and translated URLS
Logical URL:

/WMCv2/UNC/?UNC=\\serverSMB\asf\artist\title.wma HTTP/1.1
Physical URL:
C:\users\username\music\asf\artist\title.wma
The \\serverSMB\share gets translated to c:\users\username\music
Protected Streaming:
GET IWMCv2/UNC/? UNC=\\serverSMB\asf\artist\title.wma HTTP/1.1
Accept: */*
User-Agent: NSPlayer/10.0.0.3646 WMFSDK/10.0
Accept-Encoding: gzip, deflate
Host: sbhatt4:10243
Connection:Keep-Alive
HTTP/1.1401 Unauthorized
Content-Length: 618330
Content-Type: audio/x-ms-wma Server: Microsoft-HTTPAPI/1.0
Accept-Ranges: bytes
TransferMode.DLNA.ORG: Streaming
Date: Thu, 21 Jul. 2005 19:58:08 GMT
GET/WMCv2/UNC/? UNC=\\serverSMB\asf\artist\title.wma HTTP/1.1
Accept: */*
User-Agent: NSPlayer/10.0.0.3646 WMFSDK/10.0
Accept-Encoding: gzip, deflate
Authorization: Negotiate
YIIOIAYGKwYBBQUCoIIOFDCCDhCgJDAiB gkqhkiC9xIBAgIGCSqGSI
b3EgECAgYKKwYBBAGCNwICCqKCDeYEgg3i YII N3gYJKoZlhvcSAQ
ICAQBugg3NMIINyaADAgEFoQMCAQ6iBw MFACAAAACjggzlYYIM4T
CCDN2gAwIBBaEcGxpSRURNT05ELkNPUIAu TUIDUk9TTOZULkNPT
alcMBqgAwIBAaETMBEbD3dtcy1kb2dmb29kL XdzbKOCDJgwggyUoA
MCARehAwIBHqKCDIYEggyCDdZHPdQ6WT+ AK13cZU6B7TWOPy+1 gdfYpVH8/
0vrTrOCayV93pUak4qyE1cO0H77oyJRMzn+R/ ZsAwPbwC
BxgGJSS72cnF4e4vNP24GUXJyFd1fj5PImqHVFph FXMUO3QaQwyXt
eVuzYyBCMIO0SIOPtGMV9nsfQkz0YOJ RcczeSL2IEnYs8ifwRUE4OY 1IT+
2f8Hy2vZFFqXo3aM+/ vvDvWJpuPer5IBGZPZbADPfka6QRh3Jqp
SA9iJnOFKGe1EO2CHfWZ3bsd4f/ 8wRxWkmQ9nZi4QIDpT9LyeYh7RI nY1alShS9y/
qQ5QGFwA/ o0YCTaIW77RGQknI8STZmi0e65nosp7uSH
0kYVZjGfq42j1Dd+fpMWAjy/BIT6xuelDrTBh+ 3hD6/fzpJTSIbmyXglHub QgXWPr/KM+
K4UpQRgoGoidBPYr3r1eXhJuBf0kJqhHgtx26f6C7/ PjSu
a+RIsI41r4AIFNPIDEsjfsHrC2pueGDEzFQTSpw9j WNK753MLM9E2wd
Q12YhuotlcAQ6yHZKs2VA0RBH/Vus/ IAyjh38oMmqxscpPrFCwFi6sN2
CjocNaucJaSGLVj0VPTVS/Ejl4Z RURNT05E
Host: sbhatt4: 10243
Connection: Keep-Alive
HTTP/1.1 200 OK
Content-Length: 618330
Content-Type: audio/x-ms-wma Server: Microsoft-HTTPAPI/1.0
Accept-Ranges: bytes
TransferMode.DLNA.ORG: Streaming
Date: Thu, 21 Jul. 2005 19:58:08 GMT It is to be understood that while the exemplary requests illustrated above use the control protocol DLNA Http and the authentication protocol Negotiate, other protocols, compliant control protocols, and/or authentication protocols may be used without departing from the scope of the invention.

The MDA relies on the WMC to authenticate the remote user's permission to access this URL at 222 (see also the exemplary requests illustrated above). For example, in one embodiment, the MDA provides the authentication event including the SMB-HME streaming URL to the WMC and, in response, the WMC generates an appropriate challenge via a security support provider interface (SSPI) or other interface and returns the challenge to the MDA. The MDA then sends the challenge to the media player at 222. The media player responds to the challenge and, as a result, an access token is obtained by the MDA at 224. For example, the access token may be a WINDOWS® handle that represents a specific user. This handle may be passed or transmitted to other APIs to validate the user and/or to impersonate a user. Other types of identification tokens or keys that represent or identify the user may be used without departing from the scope of the present invention. The WMC successfully authenticates the user at 226. In addition, MDA generates authorization event to WMC and WMC confirms whether user has access to the content. If user has the access to the content, WMC passes the physical location of the file to MDA at 226. Thus, the MDA has determined that the stream request is from an authenticated user that can access that file and permits access to the protected file and MDA streams out content based appropriately to the media player at 228.

In one embodiment, this sequence illustrates that MDA is capable of consuming a UNC path and rendering a stream while validating the user via existing technologies. In embodiments of a WINDOWS® Media Player client, the authentication protocol may be SSPI because it will make use of the user's credentials and validate precisely that the user has access to the file in question.

In one embodiment in a WINDOWS® environment, WINDOWS® Explorer launches the registered application for the file extension. In the case of WINDOWS® Media Audio or WINDOWS® MedialVideo, the application is WINDOWS® Media Player (WMP). Given a UNC path from WINDOWS® Explorer, WMP:

i. Validates the logged on user has access to the UNC path;
 ii. Resolves the UNC path to a streaming URL; and
 iii. Opens the streaming URL for playback.

If any edits are performed on the data associated with the file 104 provided via the streaming URL, the SMB path may be used to affect any changes. This permits any PC user that can prove access to a SMB-accessible file on a source device to stream the file from the source device to a remote device without requiring license acquisition on the remote device. For example, user 108 may go through 206 to 212 for streaming content that does not require a license, such as unprotected content. In addition, at 216, URL and request for a streaming license is directed at MDA exposing SMB path. This request may include a certificate proving the device's robustness and adherence to the rules provided in any license subsequently provided. The user 108 may go through 218 to 226 for streaming content that does not require a license. The MDA verifies certificate or other information provided in step 216 and returns a license and key that allows the media player to decrypt and play the content subsequently transferred.

Thus, in one embodiment, given a UNC path, playback of a file protected by DRM is enabled without requiring that the new PC log into a service or reacquire a license from other than the computer hosting the UNC path. This embodiment enables a user of the WINDOWS Shell/Explorer to freely browse or search and play music protected by DRM in their home. Further, any added security risk may be minimized by offering another method of accessing files. Although the "attack surface" gets larger, no paths of lesser security have been added, e.g., a file a given user could not see/hear before is no more exposed now.

Figure 3:
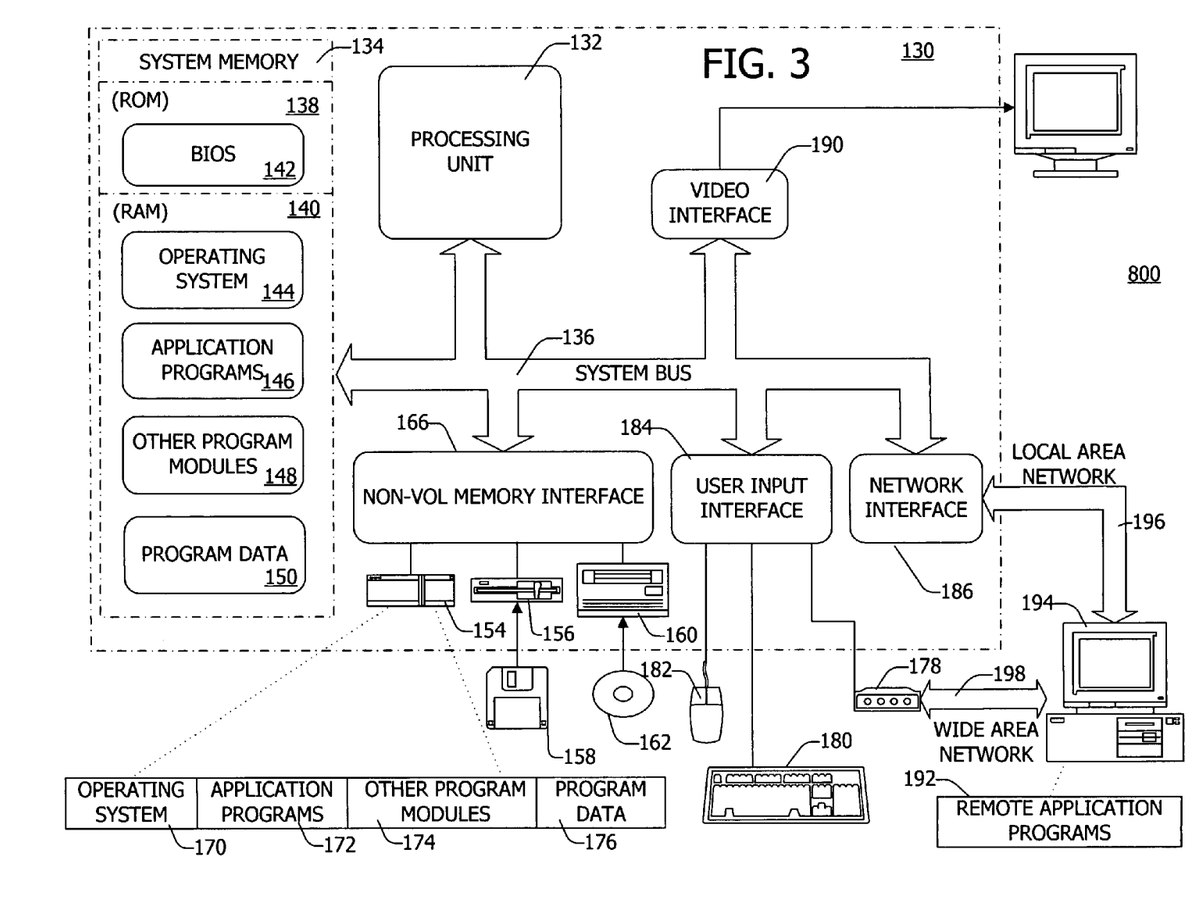
FIG. 3 is a block diagram illustrating one example of a suitable computing system environment in which embodiments of the invention may be implemented.

In operation in one embodiment, a computer 130 such as illustrated in FIG. 3 executes computer-executable instructions such as those illustrated above to function as either a remote device or a source device.

FIG. 3 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 3 illustrates operating system 144, application programs 146, other program modules 148, and program data 150.

The computer 130 may also include other removable/non-removable, volatile/nonvolatile computer storage media. For example, FIG. 3 illustrates a hard disk drive 154 that reads from or writes to non-removable, nonvolatile magnetic media. FIG. 3 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 3, provide storage of computer readable instructions, data structures, program modules and other data for the computer 130. In FIG. 3, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 3 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 3 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The various invention embodiments described herein include these and other various types of computer-readable storage media when such media contain instructions or programs for implementing the steps described below in conjunction with a microprocessor or other data processor. Embodiments also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, one embodiment of the invention is operational with numerous other general purpose or special purpose computing system environments or configurations. The computing system environment is not intended to suggest any limitation as to the scope of use or functionality of embodiments of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention embodiments include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Embodiments of the invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the embodiments of the invention.

When introducing elements of the embodiments of the invention, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that various embodiments of the invention are achieved and various advantageous results attained.

As various changes could be made in the above constructions, products, and methods without departing from the scope of the embodiments of the invention, it is intended that all matter contained in the above description and shown in the accompanying drawings shall be interpreted as illustrative and not in a limiting sense.

What is claimed is:

1. A method in which a user invokes, from a remote device, a protected file on a source device, wherein the user has a right to access the protected file, and wherein the protected file requires a locally stored license for invocation, the method comprising:

locating the protected file on the source device, wherein the protected file is deemed locatable via a server message block (SMB) path of the protected file broadcasted by the source device; and accessing the located, protected file via a media player on the remote device, said accessing comprising:

initiating the media player on the remote device upon selection of the protected file by the user;

constructing, by the media player, a streaming uniform resource location (URL) based on the SMB path for streaming the protected file to the remote device without acquiring an additional license for the remote device, said constructing comprising constructing the streaming URL from a device document provided by the source device;

requesting the protected file from the source device via the streaming URL;

responding by the remote device to an authentication request from the source device;

receiving by the remote device, in response to said responding, a physical path of the protected file from the source device, said physical path translated from the streaming URL by the source device; and streaming by the media player on the remote device the protected file via the physical path.

2. The method of claim 1 wherein the constructed streaming URL is a SMB-Home Media Ecosystem (HME) URL, and wherein locating further comprises one or more of the following: browsing the source device by the remote device to locate the protected file on the source device via the SMB oath of the protected file, or searching the source device by the remote device to locate the protected file on the source device via the SMB path of the protected file.

3. The method of claim 1 wherein responding to the authentication request comprises:

using an interface of a communication module on the source device to parse the streaming URL; and using the interface of the communication module to authenticate the user.

4. The method of claim 3 wherein using the interface of the communication module on the source device to parse the streaming URL comprises:

using a media delivery application (MDA) on the source device to generate an authentication event including a transformed URL; and using the interface of the communication module on the source device to parse the transformed URL.

5. The method of claim 4 wherein using the interface of the communication module to authenticate the user comprises:

passing via the MDA the authentication event including the parsed streaming URL to the interface of the communication module on the source device;

generating by the communication module on the source device a challenge via a security support provider interface (SSPI) and returning the challenge to the MDA;

sending by the MDA the generated challenge to the media player;

sending by the media player to the MDA a response to the challenge;

sending by the MDA the authentication event including the response to the interface of a module on the source device;

obtaining by the MDA module on the source device an access token;

confirming authentication of the user by the communication module on the source device to the MDA; and streaming by the MDA the content of the protected file to the media player.

6. The method of claim 1 further comprising editing data associated with the file via the SMB path.

7. The method of claim 1 wherein responding to the authentication request comprises:

Using a media delivery application (MDA) on the source device to generate an authentication event including a transformed URL;

Using the interface of the communication module on the source device to parse the transformed URL;

Passing via the MDA the authentication event including the parsed URL to the interface of module communication on the source device;

Generating by the communication module on the source device a challenge via a security support provider interface (SSPI) and returning the challenge to the MDA;

Sending by the MDA the generated challenge to the media player;

Sending by the media player to the MDA a response to the challenge;

Sending by the MDA the authentication event including the response to the interface of the communication module on the source device;

Obtaining by the communication module on the source device an access token;

Sending by the MDA the authentication event including the access token to the connect protocol;

Confirming authentication of the user by the communication module on the source device to the MDA; and Streaming by the MDA the content of the protected file to the media player.

8. The method of claim 1 wherein responding to the authentication request comprises:

Generating an authentication event including a transformed URL;

Parsing the transformed URL;

Generating a challenge to the media player;

Sending by the media player a response to the challenge;

Obtaining an access token;

Using the access token to confirm authentication of the user; and

Streaming the content of the protected file to the media player.

9. A system for permitting a user of a remote device to stream a protected file stored on a source device, said protected file requiring a locally stored license for invocation, said system comprising:

an interface for receiving a request from the user of the remote device for accessing the protected file on the source device, said protected file broadcasted by the source device via a server message block (SMB) path of the protected file, said request comprising a streaming uniform resource locator (URL) constructed based on the SMB oath and from a device document provided by the source device;

an authentication component for determining the permission based on the request by authenticating that the user of the remote device has a right to access a protected file based on the locally stored license, said authenticating resulting in translation of the streaming URL to a physical path of the protected file; and a streaming component for streaming the protected file in response to the request to the remote device via a path constructed by the remote device and for enabling the remote device to stream the protected file without transmitting an additional copy of the license from the source device to the remote device.

10. The system of claim 9 wherein the interface is configured to perform one or more of the following: browses the source device to locate the protected file on the source device via the SMB oath, or searching the source device by the remote device to locate the protected file on the source device via the SMB path.

11. The system of claim 9 wherein the streaming component comprises using an interface of a communication module on the source device to parse the constructed path included in the request and using the connection protocol to authenticate the user.

12. The system of claim 11 wherein the streaming component uses the connection protocol on the source device to parse the constructed path by:
   using a media delivery application (MDA) on the source device to generate an authentication event including a transformed URL; and
   using the interface of the communication module on the source device to parse the transformed URL.

13. The system of claim 12 wherein the streaming component uses the connect protocol to authenticate the user by:
   passing via the MDA the authentication event including the parsed path to the interface of the communication module on the source device;
   generating by the communication module on the source device a challenge via a security support provider interface (SSPI) and returning the challenge to the MDA;
   sending by the MDA the generated challenge to the remote device;
   sending by the remote device to the MDA a response to the challenge;
   Sending by the MDA the authentication event including the response to the interface of the communication module on the source device
   obtaining by the communication module on the source device an access token;
   confirming authentication of the user by the communication module on the source device to the MDA; and
   streaming by the MDA the content of the protected file to the remote device.

14. The system of claim 9 wherein constructed path being associated with the file is an SMB path.

15. A data structure defining a streaming uniform resource locator (URL) constructed by a remote device for use by the remote device to receive a protected file streamed over the URL by a source device, wherein the remote device constructs the streaming URL from a device document provided by the source device. wherein the user of the remote device has a right to access the protected file which requires a locally stored license for invocation, said data structure comprising:
   A streaming protocol by which the file is streamed;
   A path linking the remote device and the source device over which the streamed file is provided enabling the remote device to stream the protected file without transmitting an additional copy of the license from the source device to the remote device; and
   A sharing protocol for facilitating the transfer of the streaming file from the source device to the remote device via the path.

16. The data structure of claim 15:
   wherein the streaming protocol comprises an HTTP or RTSP protocol,
   wherein the path comprises a universal naming convention (UNC) path,
   wherein the sharing protocol comprises a server message block (SMB) path broadcasting the presence of the protected file, and
   wherein the streaming URL is a SMB-Home Media Ecosystem (HME) URL.

17. The data structure of claim 15 the streaming protocol comprises a communication module on the source device connecting the remote device and the source device for parsing the path; and the communication module authenticates the user.

18. The data structure of claim 17 the communication module on the source device defines:
   having a media delivery application (MDA) on the source device to generate an authentication event including a transformed URL; and
   having the communication module on the source device to parse the transformed URL.

19. The data structure of claim 18 wherein the communication module on the source device further defines:
   the authentication event being passed via the MDA, said authentication event including the parsed path to the communication module on the source device;
   a challenge generated by the communication module on the source device via a security support provider interface (SSPI) and returning the challenge to the MDA;
   the generated challenge sending by the MDA to the remote device;
   a response to the challenge sent by the remote device to the MDA;
   sending by the MDA the authentication event including the response to the interface of the communication module on the source device;
   an access token obtaining by the communication module on the source device;
   an authentication of the user confirmed by the communication module on the source device to the MDA; and
   the content of the protected file to the remote device streamed by the MDA.

* * * * *